Dec. 8, 1964     B. MARTINS     3,160,429
DEVICE FOR FASTENING A HUB TO A SHAFT
Filed March 15, 1960
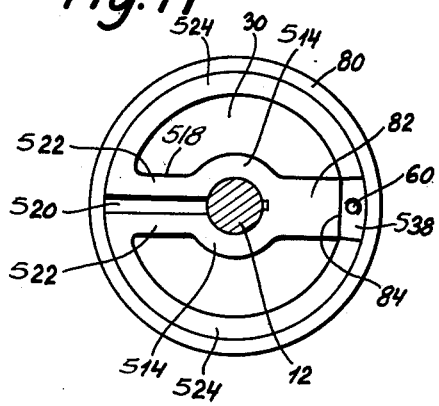
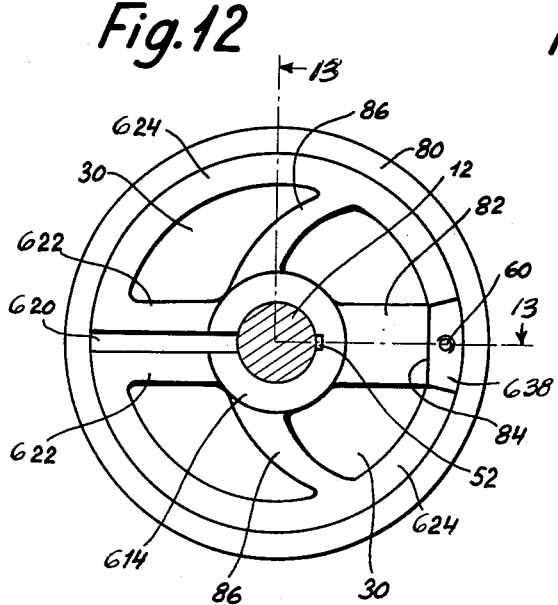
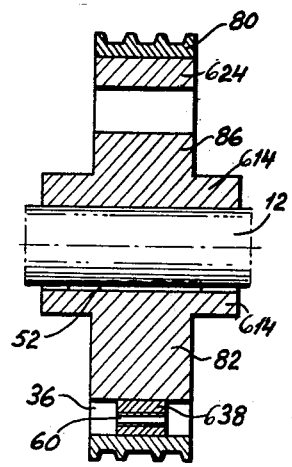
INVENTOR:
Börge Martins,

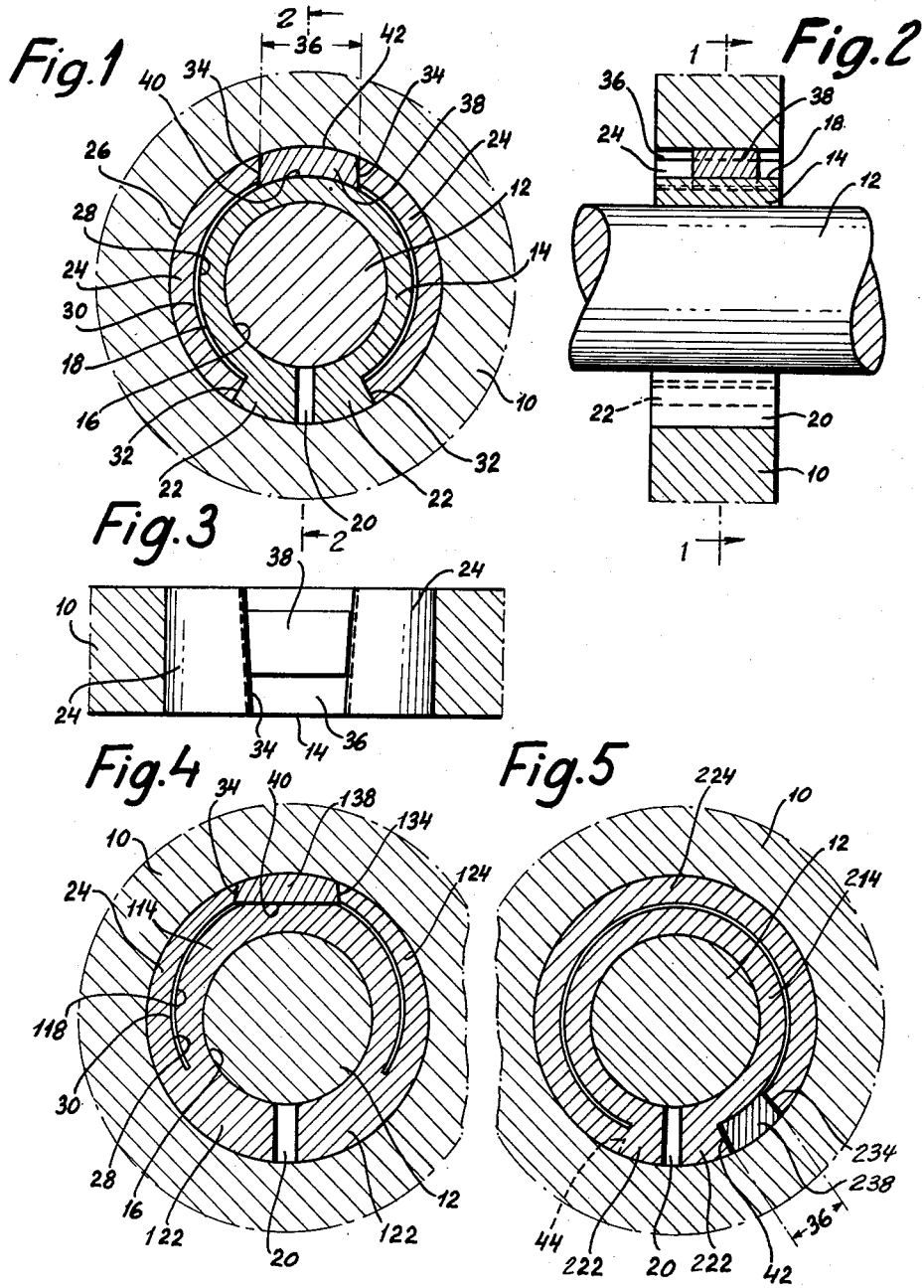

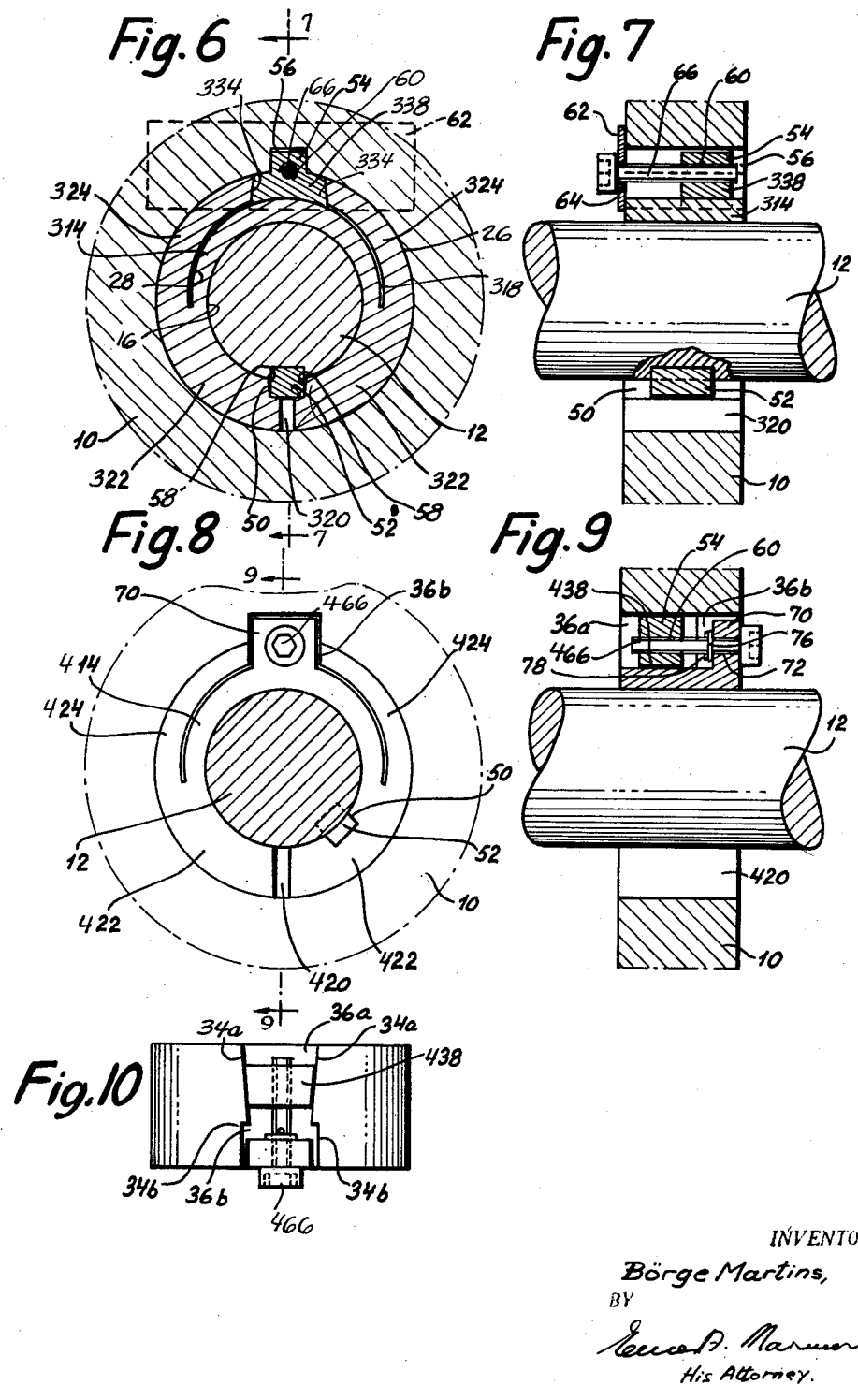

United States Patent Office 3,160,429
Patented Dec. 8, 1964

3,160,429
DEVICE FOR FASTENING A HUB TO A SHAFT
Börge Martins, 65 Norre Farimagsgade,
Copenhagen K, Denmark
Filed Mar. 15, 1960, Ser. No. 15,089
Claims priority, application Denmark May 26, 1959
22 Claims. (Cl. 287—52)

This invention relates to devices for fastening a hub to a shaft, for example for clamping pulleys, gear wheels, arms or the like machine elements to a rotatable or stationary shaft, gudgeon, pin or the like, and of the kind comprising an annular bushing split by means of a longitudinal slot and provided with an inner face and an outer face co-axial to the inner face.

It is known for fastening a hub to a shaft to use a split bushing member provided with a cylindrical inner face fitting on the shaft and a conical outer face fitting into a corresponding conical hub bore or more usually of a split annular outer ring inserted within the hub bore. By an axial displacement of such a split bushing member relative to the hub or to the outer ring the bushing member will press itself tightly against the shaft and either directly or through the outer ring also against the wall of the hub bore.

By the application of such split bushings it is necessary that the conicity of the split bushing corresponds exactly ot the conicity of the outer ring or of the hub bore. When only one split bushing member is used, the bore of the hub has to be finished very exactly to correspond to the conicity of the split bushing and this finishing is combined with relative great costs. When split bushings are used consisting of the split bushing member together with an outer ring it should not be necessary to make special preparations of the hub bore but the two split bushing members have to correspond exactly to each other so that the manufacture of such split bushings is relatively expensive owing to the necessary accuracy of the conical surfaces. Further the hitherto known split bushings demand relatively great forces for providing the necessary axial displacement of the split bushing member for fastening or loosening the hub. Still further owing to the necessity of an axial displacement it will often be difficult to obtain an exact axial placement of the bushing relative to the hub.

The primary object of the present invention is to provide a device of the kind referred to above which is at least as effective as the hitherto known split bushings but which do not demand conical surfaces and therefore can be manufactured at a smaller cost than the hitherto known split bushings.

Another object of the invention is to provide such a device which can be fastened or loosened by use of relatively small forces.

A further object of the invention is to provide a device of the kind referred to above which can be placed and clamped to the shaft as well as to the hub in the exact position wanted.

A still further object of the invention is to provide a device of the kind referred to above which is provided with an inner part to co-operate with the shaft and an outer part to co-operate with the hub bore and by which a pressure on the outer part in the circumferential direction thereof simultaneously causes a widening of the outer part so that said outer part contacts the wall of the hub bore and also causes a narrowing of the inner part so that said inner part contacts the shaft.

Still another object of the invention is to provide a device of the kind referred to above which apart from operating members can be made in one piece and nevertheless ensure powerful frictional contact with the bore hub as well as with the shaft and simultaneously ensure co-axiality between the shaft and the hub bore.

A still further object of the invention is to provide a device of the kind referred to above which can be used for fastening an element to a shaft even if the bore of the element has a diameter much greater than the diameter of a shaft, for example for fastening a pulley provided only with a rim to a shaft in which case the rim serves as a hub.

Other objects and advantages of the invention will appear from the following description taken in connection with the drawing, wherein:

FIG. 1 is a sectional view of a first embodiment, taken on the line 1—1 in FIG. 2, FIG. 2 is a sectional view of the same embodiment taken on the line 2—2 of FIG. 1, FIG. 3 is a plan view, partly in section, of the same embodiment, FIGS. 4 and 5 are sectional views corresponding to FIG. 1 of two further embodiments.

FIG. 6 is a sectional view of a fourth embodiment,

FIG. 7 is a sectional view of the embodiment shown in, and taken on the line 7—7 of, FIG. 6, FIG. 8 is a front elevational view, partly in section, of a fifth embodiment, FIG. 9 is a sectional view of the same embodiment taken on the line 9—9 of FIG. 8, FIG. 10 is a plan view of the same embodiment, FIG. 11 is a front elevational view, partly in section, of a further embodiment, FIG. 12 is a front elevational view, partly in section, of a still further embodiment arranged inside a V-belt pulley, and FIG. 13 is a sectional view taken on line 13—13 in FIG. 12.

In the drawings 10 denotes the hub of a machine element to be fastened on a shaft 12. The bore of the hub has a diameter which is greater than that of the shaft so that the fastening device may be applied.

The fastening device shown in FIGS. 1 to 3 comprises an annular inner part 14 provided with a cylindrical inner face 16 the inner diameter of which corresponds to that of the shaft 12 and so that the inner part fits easily around the shaft 12. The outer face 18 of the inner part 14 is in this embodiment cylindrical too and has a diameter slightly smaller than the inner diameter of the bore of the hub 10.

The inner part 14 is slit by means of an axial slot 20 and is provided at each side of this slot 20 with a radially outwardly extending projection 22. On each side of the inner part 14 a flap 24 is arranged and formed as an annular segment and provided with an outer face 26 having a diameter corresponding to the diameter of the bore of the hub 10 and easily fitting within said bore, and with an inner face 28 separated from the outer face 18 of the inner part 14 by a space 30. The one end 32 of each flap 14 fits tightly against the adjoining projection 22. The two opposite free end faces 34 of the flaps 24 converge as appears from FIG. 3 and define between them a gap 36. In this gap 36 an expansion member 38 is arranged formed as a wedge 38 having converging side faces abutting the flap end faces 34. The wedge 38 is provided with a cylindrical inner face 40 the diameter of which corresponds to the diameter of the outer face 18 of the inner part 14 so that the wedge is guided by the last said outer face, further the wedge is provided with a cylindrical outer face 42 the diameter of which corresponds to the diameter of the bore of the hub 10.

When the bushing comprising the inner part 14 and the flaps 24 is placed upon the shaft 12 and inside the bore of the hub 10, the wedge 38 is forced into the gap 36 between the flap end faces 34 and thereby the flaps 24 are in their circumferential direction pressed towards the projections 22. Hereby these are pressed towards each other so that the inner part 14 is firmly clamped around the shaft 12. Simultaneously the flaps 24 are pressed outwardly and thereby brought to fit tightly against the inner wall of the bore of the hub 10 thereby fastening the hub 10 to the shaft 12.

As appears from FIG. 1, the flap end faces 34 as well as the side faces of the wedge 38 converge in outward direction whereby it is ensured that also the free ends of the flaps 24 are pressed outwardly by the wedge and thereby that the circumferential length of the parts of the flaps 24 contacting the wall of the hub bore is as long as possible.

The embodiment shown in FIG. 4 differs from the one shown in FIGS. 1 to 3 mainly thereby that each of the two flaps 124 is integral with its adjoining projection 122 and the bushing comprising the inner part 114 and the two flaps 124 thereby being in one piece. Thus the bushing can be made for example as an integral forging or cast solid. The spaces 30 between the flaps 124 and the inner part 114 can in such cases be made either in connection with and simultaneously with the forging or casting or can be sawed or cut afterwards.

From FIG. 4 it further appears that the outer face 118 of the inner part 114 and the inner face 28 of each flap 124, which two faces between them define the space 30, are formed as co-axial cylinder faces being eccentric, however, to the inner face 16 of the inner part 114. Hereby it is obtained that the thickness of each flap 124 increases from the free end 34 of the flap towards the adjoining projection 122. This involves that the portion of each flap 124 nearest the free end 34 of the flap is somewhat more yielding than the portion nearest the projection 122 so that the first said portion can be deformed to engage tightly the inner wall of the hub bore without it being risked that the flap 124 breaks at its connection to the projection 122. Simultaneously the thickness of the portions of the inner part 114 situated opposite each flap 124 increases in thickness in opposite directon of the corresponding flaps. This has shown to give the most suitable distribution of the stresses within the inner part 114 so that even the risk for breaking of the inner part is eliminated.

Still further in the embodiment shown in FIG. 4 the outer face 118 of the inner part 114 is flattened at 40 opposite the wedge 138 which is provided with a corresponding flat inner guide face, so that the wedge can be made as thick and thereby as strong as possible.

The fastening device shown in FIG. 5 differs from the ones shown in FIGS. 1 to 3 and 4 thereby that it is provided with only one single flap 224 integral with the one projection 222, which flap 224 surrounds, but is spaced from the greatest part of the inner part 214 so that the gap 36 in which the expansion means, for example the wedge 238 is arranged, is defined between the free end 34 of this single flap 224 and the side face 42 of the second projection 222.

This embodiment is of special interest when great forces have to be transferred between the shaft 12 and the hub 10, and key and key-ways can not be arranged, most often in connection with small diameters of shaft and hub bore.

By the use of a single flap 224 this can be given a relatively great circumferential length and thereby a relatively great yielding so that it can with great force be pressed towards the inner wall of the hub bore along the greatest part of its circumferential length and thereby ensure the greatest possible friction. On the other hand the embodiment shown in FIG. 5 is quite unbalanced and demands at least in connection with fast-running shafts special balancing means.

Although in FIG. 5 the flap 224 is shown integral with the adjoining projection 222 it can be made as a separate member tightly fitting against the said projection as indicated by the broken line 44.

In many cases it can be suitable to combine the friction connection obtained between the hub and the shaft by using a fastening device as previously described with a key and key-ways connection.

Examples of such a combination is shown in FIGS. 6 to 10.

FIGS. 6 and 7 show a fastening device as to principle corresponding to that previously described in connection with FIG. 4. However, in this case the slot 320 is provided at its inner part with an enlargement forming a key-way 50 for receiving a key 52 on the shaft 12. Further the wedge 338 is provided with an outwardly extending projection 54 forming a key to match with a key-way in the hub 10.

As appears from FIG. 6 the side faces 58 of the enlargement or key-way 50 converge slightly outwardly from the inner face 16 of the inner part 314 so that they cannot by engaging the key 52 prevent the inner part 314 from being clamped around the shaft 12.

FIGS. 6 and 7 also show suitable means for forcing the wedge 338 into the gap 36 between the free ends 334 of the flaps 324. The wedge 338 which owing to the projection 54 has a relatively great thickness is provided with a threaded longitudinal hole 60. When the wedge 338 has to be pressed into the gap 36, a disc 62 provided with a hole 64 is as shown in FIG. 7 and indicated in broken lines in FIG. 6 placed at the front side of the hub 10 with the hole 64 co-axial to the hole 60. A bolt 66 is from the outside of the disc 62 through the hole 64 screwed into the threaded hole 60 whereby the wedge 338 is forced towards the left in FIG. 7 and thus forced in between the flap end faces 334. When the clamping operation is finished the bolt 66 and the disc 62 are removed. Provided the angle between the converging flap end faces 334 and thereby between the corresponding side faces of the wedge 338 is so chosen—depending on the coefficient of friction between the wedge and the flaps—that the wedge is self-locking, in practice less than 10°, no special means are necessary for maintaining the fastening device in clamping position after the wedge 338 has been pressed into position.

In some cases it may be advantageous, however, to provide the fastening device itself with means for displacement of the wedge into and out of clamping position, for example in case a fastening device is used in connection with machine elements which often need to be fastened on and again removed from a shaft.

In such cases a fastening device as that shown in FIGS. 8 to 10 can be suitable.

In this embodiment the gap between the flaps 424 is formed of two interconnected parts 36a and 36b, the first one 36a being limited by converging side faces 34a serving for receiving the wedge 438, the other part 36b being limited by parallel side faces 34b. The inner part 414 is provided with a radial outwardly extending projection 70 arranged within the gap part 36b and extending so long outwards that it can serve as a key. The wedge 438 is provided with an outwardly extending projection 54 that has a longitudinal threaded hole 60, FIG. 9. The projection 70 of the inner part 414 is provided with a hole 72 co-axial to the hole 60. A bolt 466 is led from the front side of the inner part projection 70 through the hole 70 and engages the threaded hole 60. On the inner side of the projection 70 a washer 76 is inserted around the bolt 466 and maintained in position by means of a pin 78. By rotating the bolt 466 in one direction the wedge is drawn towards the projection 70 for expansion of the gap while by rotation of the bolt 466 in the opposite direction the wedge is forced away from the projection 70 whereby the fastening device is loosened from the hub 10 as well as from the shaft 12.

The fastening devices described above are intended to be used in such cases where previously normal split bushings have been used, it is in cases where the difference between the outer diameter of the shaft and the inner diameter of the bore is comparatively small. The new fastening device can be used, however, even when said difference of diameter is great, for example for being inserted directly between the rim of a pulley and a shaft.

An embodiment of the invention intended for such a use is shown in FIG. 11. This embodiment is inserted within a rim 80 and a shaft 12 and corresponds as to all essential features to the embodiment shown in FIG. 4, but departs therefrom in that the spaces 30 between the inner faces of the flaps 524 and the outer face 518 of the inner part 514 are relatively large. For preventing that the device becomes too yielding the inner part 514 is provided diametrically opposite the slot 520 with a radial projection 82 provided with an end face 84 serving as a guide face for the wedge 538 and thereby stiffening the device.

A corresponding embodiment is shown in FIGS. 12 and 13. In this embodiment, however, each of the two flaps 624 is for stiffening purpose connected to the inner part 614 by means of a spoke 86 connected to the flap 624 in a greater angular distance from the slot 620 than the connection between the spoke 86 and the inner part 614. Hereby is obtained that the inner part 614 is influenced from the flaps 624 not only through the projections 622 but even through the spokes 86, so that the necessary clamping of the inner part 614 around the shaft 12 is ensured. This is obtained, however, without the spokes preventing the flaps 624 from being pressed outwardly because of the oblique arrangement of the spokes 86.

As appears from FIG. 13, the width of the flaps 624 measured in the axial direction of the device differs from the width of the inner part 614 measured in the same direction. In connection with devices having greater outer diameters, as is the case in the embodiments shown in FIGS. 11 to 13, it will often be expedient as shown that the flaps are more narrow than the inner part, whereas in such cases where the clamping device has to be compared with normal split bushings in most cases it is most appropriate that the flaps and the inner part are of the same width.

From FIG. 8 and FIGS. 11 to 13 it further appears that when a key and key-way connection between the shaft 12 and the inner part 414, 514, 614 is wanted, it is not necessary that the key-way forms a widening of the slot as shown in FIG. 6, but that the key-way 50 in the inner part may be made independent of the slot.

In the embodiment shown the circumferential length of the flaps compared with the total circumferential length of the device differs from embodiment to embodiment. In practice the circumferential length of the flap, FIG. 5, or the total circumferential length of the two flaps together ought to be at least one fourth, preferably at least one half, of the total circumferential length of the bushing comprising the inner part and the flap or flaps.

Having thus described the construction and operation of preferred embodiments of the invention, it will be apparent to those skilled in the art that further modifications and changes can be made without departing from the spirit of the invention, the scope of which is commensurate with the appended claims.

What is claimed is:

1. A device for fastening a hub to a shaft, comprising in combination; an inner annular part having an inner face for engagement with said shaft, and an outer face; said inner annular part being split by means of a slot; said inner annular part being provided at each side of said slot with an outwardly extending projection; at least one curved flap being arranged outside said inner annular part, said flap having an outer face for engagement with the wall of the hub bore, and an inner face spaced from said outer face of said inner annular part, said flap having its one end fitting the adjoining one of said two projections; the other end of said flap and the other of said two projections defining between them a gap; means being arranged bridging said gap and operable to engage and to exert adjustable pressure between said other flap end and other projection.

2. A device as defined in claim 1, said flap being integral with the adjoining one of said two projections.

3. A device as defined in claim 1, said inner annular part being provided with a key-way to engage a corresponding key on the shaft.

4. A device as defined in claim 3, said key-way having side faces converging outwardly from said inner surface of said inner annular part.

5. A device as defined in claim 3, said slot being provided with a widening at the inner side of said inner part, said widening constituting said key-way.

6. A device for fastening a hub to a shaft, comprising in combination; an inner annular part having an inner face for engagement with said shaft, and an outer face; said inner annular part being split by means of a slot and being provided at each side of said slot with an outwardly extending projection; two curved flaps being arranged outside said inner annular part, each said flap having an outer face for engagement with the wall of the hub bore, and an inner face spaced from said outer face of said inner annular part; said outer faces of said flaps being co-axial to said inner face of said inner annular part; the one end of each said flap fitting the adjoining one of said two projections; said two flaps defining between their free other ends a gap; expansion means being arranged in said gap by means of which said gap can be broadened and the said two flaps thereby be pressed towards each one of said two projections.

7. A device as defined in claim 6; each of said two flaps being integral with the adjoining one of said two projections.

8. A device as defined in claim 6, said gap being arranged diametrically opposite said slot.

9. A device as defined in claim 6, said inner side of each said flap being spaced from said outer side of said inner annular part by a curved space.

10. A device as defined in claim 9; the thickness of each said flap increasing in direction away from said free end of said flap.

11. A device as defined in claim 9; said inner part having a portion opposite each said flap; the thickness of said portion increasing in direction away from the adjoining one of said two projections.

12. A device as defined in claim 9, said curved space being limited by two co-axial cylinder faces which are eccentric to said inner face of said inner annular part and to said outer faces of said two flaps.

13. A device for fastening a hub to a shaft, comprising in combination; an inner annular part having an inner face for engagement with the shaft, and an outer face; said inner annular part being split by means of a slot and being provided at each side of said slot with an outwardly extending projection; at least one outer curved flap being arranged outside said inner part; said flap having an inner face spaced from said outer face of said inner annular part and an outer face co-axial to said inner face of said inner annular part and intended for engagement with the wall of the hub bore; the one end of said flap fitting the adjoining one of said two projections; the free other end of said flap and the other one of said two projections defining between them a gap; expansion means being arranged in said gap by means of which said gap can be broadened; said expansion means comprising a wedge member having converging side faces, one of which engages the said free end of said flap.

14. A device as defined in claim 13, said wedge member being provided with an outwardly extending projection forming a key to match with a corresponding key-way in the wall of the hub bore.

15. A device as defined in claim 13; said outer face of said inner annular part having a portion situated opposite said wedge member, said portion of said outer face being flat and serving as a guide face for said wedge member.

16. A device as defined in claim 13; said flap being integral with the adjoining of said two projections.

17. A device as defined in claim 13; said wedge member being provided with a threaded longitudinal hole for a screw pin for longitudinal displacement of said wedge member in said gap.

18. A device as defined in claim 17, said inner annular part being provided with a further projection extending outwardly into said gap; said further projection being provided with a longitudinal hole for said screw pin.

19. A device as defined in claim 18, said further projection forming a key to match with a corresponding keyway in the wall of the hub bore.

20. A device for fastening a hub to a shaft, comprising in combination; an inner annular part having an inner face for engagement with the shaft, and an outer face; said inner annular part being split by means of a slot and being provided at each side of said slot with an outwardly extending projection; two curved flaps being arranged outside said inner annular part at a distance therefrom; each said flap having an outer face for engagement with the wall of the hub bore, and an inner wall spaced from said outer face of said inner annular part by a curved space; the one end of each of said two flaps fitting the adjoining one of said two projections; said two flaps defining between their free other ends a gap; expansion means being arranged in said gap by means of which said gap can be broadened and the said two flaps thereby be pressed towards one of said two projections each; said inner annular part being provided opposite said gap with a further outwardly extending projection engaging said expansion means.

21. A device for fastening a hub to a shaft, comprising in combination; an inner annular part having an inner face for engagement with said shaft, and an outer face; said inner annular part being split by means of a slot and being provided at each side of said slot with an outwardly extending projection; two curved flaps being arranged outside said inner annular part a distance therefrom; each said flap having an outer face for engagement with the wall of the hub bore, and an inner wall spaced from said outer face of said inner annular part by a curved space; the one end of each of said two flaps fitting the adjoining one of said two projections; said two flaps defining between their free other ends a gap; expansion means being arranged in said gap by means of which said gap can be broadened and the said two flaps thereby be pressed towards each one of said two projections; each said flap being connected a distance from the adjoining one of said two projections to said inner annular part by means of a spoke; said spoke being connected to said flap at a greater angular distance from said slot than its connection to said inner annular part.

22. A device as defined in claim 21; said inner annular part being provided opposite said gap with a further outwardly extending projection engaging said expansion means.

References Cited in the file of this patent
UNITED STATES PATENTS

| | | |
|---|---|---|
| 174,177 | Albrecht | Feb. 29, 1876 |
| 286,340 | Spaulding | Oct. 9, 1883 |
| 602,287 | Green | Apr. 12, 1898 |
| 625,948 | Bickel | May 30, 1899 |